(12) United States Patent
Stroh et al.

(10) Patent No.: US 9,358,633 B2
(45) Date of Patent: Jun. 7, 2016

(54) ULTRASONIC WELDING DEVICE

(71) Applicant: SCHUNK SONOSYSTEMS GMBH, Wettenberg (DE)

(72) Inventors: Heiko Stroh, Wettenberg (DE); Alexander Ziesler, Niedernberg (DE); Peter Wagner, Wettenberg (DE); Sinan Koc, Mucke (DE); Dieter Stroh, Wettenberg (DE)

(73) Assignee: SCHUNK SONOSYSTEMS GMBH, Wettenberg (DE)

( * ) Notice: Subject to any disclaimer, the term of this patent is extended or adjusted under 35 U.S.C. 154(b) by 0 days.

(21) Appl. No.: 14/432,843

(22) PCT Filed: Apr. 3, 2014

(86) PCT No.: PCT/EP2014/056654
§ 371 (c)(1),
(2) Date: Apr. 1, 2015

(87) PCT Pub. No.: WO2014/170131
PCT Pub. Date: Oct. 23, 2014

(65) Prior Publication Data
US 2016/0023297 A1  Jan. 28, 2016

(30) Foreign Application Priority Data

Apr. 17, 2013 (DE) .......................... 10 2013 103 887

(51) Int. Cl.
*B23K 1/06* (2006.01)
*B23K 20/10* (2006.01)
*B06B 3/00* (2006.01)

(52) U.S. Cl.
CPC ................ *B23K 20/106* (2013.01); *B06B 3/00* (2013.01)

(58) Field of Classification Search
None
See application file for complete search history.

(56) References Cited

U.S. PATENT DOCUMENTS 5,603,444 A * 2/1997 Sato ..................... B23K 20/106
                                                            228/1.1
5,730,832 A * 3/1998 Sato ....................... B23K 20/10
                                                            156/499

(Continued)

FOREIGN PATENT DOCUMENTS

DE         3508122 C2    6/1989
DE        19859355 C2    4/2003

(Continued)

OTHER PUBLICATIONS

International Search Report dated Sep. 1, 2014, corresponding to International Patent Application No. PCT/EP2014/056654.

*Primary Examiner* — Kiley Stoner
(74) *Attorney, Agent, or Firm* — Ladas & Parry LLP (57) ABSTRACT

The invention relates to an ultrasonic welding device having an oscillator, having a sonotrode, which can be caused to oscillate with a wavelength, and has a welding region in the vibration antinode of the sonotrode. The sonotrode is supported at the vibration node of the sonotrode in a first bearing. To enable both a radial and an axial alignment of the sonotrode, the first bearing has a projection, which has a U-shaped geometry in a section extending in a longitudinal direction of the sonotrode, which U-shaped geometry has side legs and a cross leg that connects the side legs, the projection engages in a recess in the sonotrode matched to the U-shaped geometry, the sonotrode is supported on the cross leg of the projection in a planar manner, and the sonotrode is axially aligned by means of at least one side leg of the projection.

10 Claims, 5 Drawing Sheets

(56) References Cited

U.S. PATENT DOCUMENTS

| | | | | |
|---|---|---|---|---|
| 6,173,878 B1* | 1/2001 | Stroh | B23K 20/106 | 228/1.1 |
| 6,537,403 B1* | 3/2003 | Blenke | B06B 3/00 | 156/555 |
| 6,547,903 B1* | 4/2003 | McNichols | B06B 3/00 | 156/358 |
| 6,786,384 B1 | 9/2004 | Haregoppa | | |
| 2003/0136523 A1* | 7/2003 | Takahashi | B23K 20/10 | 156/580.1 |
| 2007/0228107 A1* | 10/2007 | Shimizu | B23K 20/10 | 228/110.1 |
| 2007/0257088 A1* | 11/2007 | Steiner | B23K 20/004 | 228/110.1 |
| 2008/0237299 A1* | 10/2008 | Vogler | B06B 3/00 | 228/1.1 |
| 2011/0220292 A1* | 9/2011 | Short | B23K 20/103 | 156/580.1 |
| 2012/0298645 A1* | 11/2012 | Kleespiess | H01R 4/029 | 219/137 R |
| 2013/0075454 A1* | 3/2013 | Buettiker | B06B 3/00 | 228/110.1 |
| 2013/0213580 A1* | 8/2013 | Thaerigen | B06B 3/00 | 156/580.2 |
| 2013/0284379 A1* | 10/2013 | Patrikios | B06B 3/00 | 156/580.1 |
| 2015/0068664 A1* | 3/2015 | Stober | B31F 1/08 | 156/73.1 |
| 2015/0107780 A1* | 4/2015 | Hull | B29C 66/1122 | 156/580.1 |
| 2015/0288123 A1* | 10/2015 | Wagner | B23K 20/106 | 228/110.1 |

FOREIGN PATENT DOCUMENTS

| | | | | |
|---|---|---|---|---|
| DE | 102005063230 B3 | | 7/2007 | |
| DK | WO 2006099872 A1 | * | 9/2006 | B06B 3/00 |
| EP | 1566233 A1 | | 8/2005 | |
| JP | 2002343831 A | | 11/2002 | |

* cited by examiner

ULTRASONIC WELDING DEVICE

This application is a 371 of PCT/EP2014/056654, filed on Apr. 3, 2014, which claims priority to German Application No. 102013103887.5 filed Apr. 17, 2013.

The invention relates to an ultrasonic welding device with an oscillator comprising a sonotrode that can be put in oscillation with a wavelength λ and comprises at least one welding range that can be associated with a counterelectrode for welding metallic parts, wherein the sonotrode is supported at its oscillation node in a first bearing.

A corresponding device can be gathered from DE 198 59 355 C2. The bearing receives radial as well as axial forces and also bending- and torsional moments. The bearing comprises a radially projecting, first section at a distance of λ/4 to the sonotrode head in whose range the welding surface is present, which section merges for its part into a second section running in the longitudinal direction of the sonotrode and at a distance from it.

According to DE 35 08 122 C2 a sonotrode of an ultrasonic welding device is punctually supported by a plurality of studs originating perpendicularly to the longitudinal axis of the sonotrode.

DE 10 2005 063 230 B3 is a device for the ultrasonic working of a material. A sonotrode is connected to two boosters by which the oscillator comprising the sonotrode and the boosters is supported. To this end the boosters are surrounded by a pipe piece or a casing that are connected to the boosters by an interference fit or by screwing.

Previously known arrangements for supporting an oscillator of an ultrasonic welding device require expensive adjustments in order to axially and radially align the sonotrode in order to be able to carry out high-quality welding processes in a reproducible manner.

The present invention has the basic problem of further developing an ultrasonic welding device of the previously described type in such a manner that that a radial as well as an axial alignment of the sonotrode is possible with constructively simple measures without expensive mounting measures being required.

The problem is essentially solved in accordance with the invention in that the first bearing has a projection with a U-shaped geometry with side shanks and a cross shank connecting them in a section running in the longitudinal axis of the sonotrode, that the projection engages into a recess of the sonotrode adapted to the U-shaped geometry, that the sonotrode is supported in a planar manner on the cross shank of the projection, and that an axial alignment of the sonotrode takes place via at least one of the side shanks of the projection. The projection has in particular in the section running in the direction of the longitudinal axis of the sonotrode a trapezoidal geometry, in particular that of a symmetrical trapezoid.

The teaching of the invention brings about a radial alignment of the sonotrode in that it is supported in a planar manner on the cross shank by a planar section associated with the cross shank. In distinction to the prior art, no punctual bearing but rather a planar support takes place.

The axial alignment takes place in that the sonotrode rests with a section on at least one of the side shanks of the projection, wherein in particular a planar support also takes place. As regards the remaining side shank, the sonotrode can be at a distance from it.

Furthermore, it is provided that the first bearing comprises a bearing running transversely to the cross shank and in the longitudinal direction of the sonotrode against which bearing the sonotrode can be pressed by a force acting on it.

The force acting on the sonotrode in the direction of the support that can be produced by a pressure element like a screw, and the pressure element can originate from the housing or the machine body of the ultrasonic welding device.

According to the invention a planar support of the sonotrode takes place in the oscillator node of the sonotrode with simple constructive measures, therefore, at an interval of λ/4 from the welding area or an area running adjacent to the latter area. An adjacently running area comprises an interval λ/4±10 mm relative to the welding area. The sonotrode has a length N·λ/2 with N=a positive whole number.

An automatic axial alignment of the sonotrode takes place when the projection, in particular with a trapezoidal geometry in section, engages into the corresponding geometrically adapted recess of the sonotrode. A radial alignment takes place at the same time by the planar support. Therefore, as a result of these measures the sonotrode can be introduced into a recess and fixed in a simple manner that is then introduced into a housing of an ultrasonic welding device and connected to this housing e.g. by a dovetail connection, as is known for punctual welding systems. Refer to this extent to a construction like the ultrasonic welding device of the type DS20 II of the Schunk Sonosystems GmbH, Wettenberg, Federal Republic of Germany. This construction is expressly referred to.

In particular, the invention is distinguished in that the sonotrode has a length λ, that, the welding area, considered in the longitudinal direction, runs in the middle area of the sonotrode, that the first bearing runs on one side of the welding area and a second bearing runs at a distance of λ/4 on the other side of the welding area, wherein the second bearing is in particular a plastic bearing. The sonotrode should be positively supported in the second bearing and have on the sonotrode side a U-shape with side shanks whose inner inside distance on the opening side is equal to or slightly greater than the cross-sectional width of the sonotrode between the side shanks. Therefore, the setting of the sonotrode into the second bearing and its removal from it is possible with simple constructive measures.

However, the invention is also distinguished in that the sonotrode can be connected to a booster that is supported on a third bearing in the longitudinal direction of the sonotrode at a distance of ³⁄₄λ from the welding area or the area adjacent to the latter area, which third bearing is in particular a plastic bearing preferably in the shape of a movable bearing. The third bearing can consist of two partial bearing elements that each have a semicircular recess for the booster on the booster side.

In particular, it is provided that the support surface of the sonotrode on the projection in the direction of the longitudinal axis of the sonotrode has a length L with $1 \text{ mm} \leq L \leq 10 \text{ mm}$ and/or a width B with $5 \text{ mm} \leq B \leq 60 \text{ mm}$. The width runs perpendicularly to the longitudinal axis of the sonotrode. The highest of each cross shank perpendicular to the longitudinal axis of the sonotrode, that is, the depth $T_s$ of the recess should be $1 \text{ mm} \leq T_s \leq 5 \text{ mm}$. The angle α between the cross shank and the side shanks should be $90° \leq \alpha \leq 150°$.

Further details, advantages and features of the invention result not only from the claims, the features to be gathered from them—either alone and/or in combination—but also from the following description of preferred exemplary embodiments to be gathered from the drawings.

In the figures, in which basically the same reference numerals can be used for the same elements, different embodiments of sonotrodes are shown that are supported in accordance with the invention in a first bearing. This makes possible the setting up and positioning of an oscillator comprising the sonotrode in a simple manner without expensive adjusting measures being required. The corresponding oscillators are built into ultrasonic welding systems in order to weld metallic parts, in particular to weld end nodes or through nodes of stranded wires, lines with contact or electrical structural elements such as IGBTs.

Figure 1:
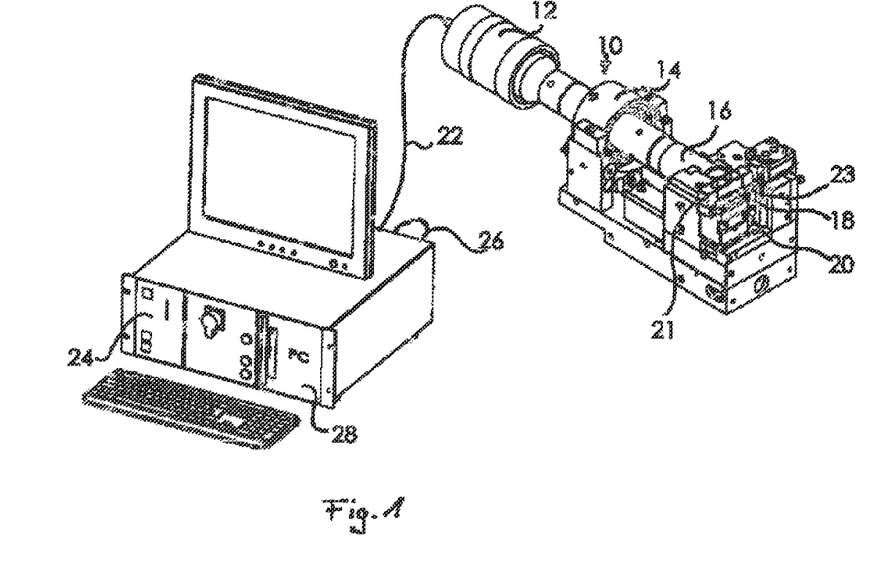
FIG. 1 shows a basic view of an arrangement for welding metals.

FIG. 1 basically shows an ultrasonic welding system with which stranded wires are to be welded to an end node. The system comprises an ultrasonic welding device or ultrasonic welding machine 10 that comprises a converter 12 in a customary manner that is connected to an oscillator consisting in the exemplary embodiment of a booster 14 and a sonotrode 16. The sonotrode 16 comprises a welding surface in its head 18 running in the maximum amplitude which welding surface is associated with a counterelectrode 20—also called anvil—and with side slides 21, 22 that taken together surround a compression chamber.

The converter 12 is connected via a line 22 to a generator 24 connected for its part via a line 26 to a computer 28 into which welding parameters and cross sections of the materials of the stranded wires to be welded are inputted and from which appropriately stored values can be retrieved. Refer, however in this regard to sufficiently known ultrasonic welding systems in the prior art.

In order to carry out weldings in a reproducible manner, an exact axial and radial mounting of the sonotrode is required. The mounting runs in the oscillation node of the sonotrode, that is, at a distance of λ/4 from the welding surface that is associated with the counterelectrode and between which and the counterelectrode the materials to be welded are arranged. λ is the wavelength at which the sonotrode oscillates when excited with ultrasound.

The distance λ/4 encloses an area adjacent to the latter. In the case of sonotrodes with a length λ the distance can be λ/4±5 mm. in the case of sonotrodes with a length λ/2 distance can be, e.g., λ/4±10.

Figure 2:
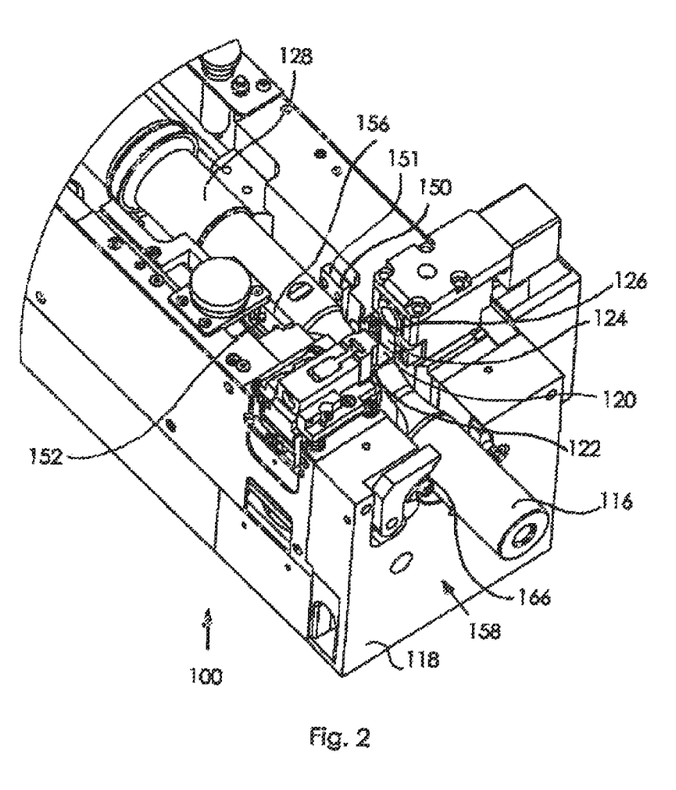
FIG. 2 shows a section of a stranded welding system.

FIG. 2 shows a section of an ultrasonic welding system 100 comprising a sonotrode 116 with a length λ corresponding to the wavelength λ and located supported in a machine body 118 as will be explained in detail in the following. The sonotrode 116 has a welding surface 120 in the central area which surface limits a compression chamber on the bottom. The compression chamber is furthermore limited by a slider 122 running perpendicularly to the welding surface 120, by an opposite guide 124 of an anvil 126 that can shift parallel to the welding surface 120 of the sonotrode and can be adjusted in its direction by the guide 124. Refer for this to sufficiently known constructions like those also described in EP 566 233, to whose disclosure express reference is made.

The sonotrode 116 is connected to a booster 128 that emanates from a converter 12 according to the view of FIG. 1.

The bearing for the oscillator consisting of the sonotrode 116 and the booster 128 and the converter 12 is explained in detail using the FIGS. 3 and 5-7.

Figure 3:
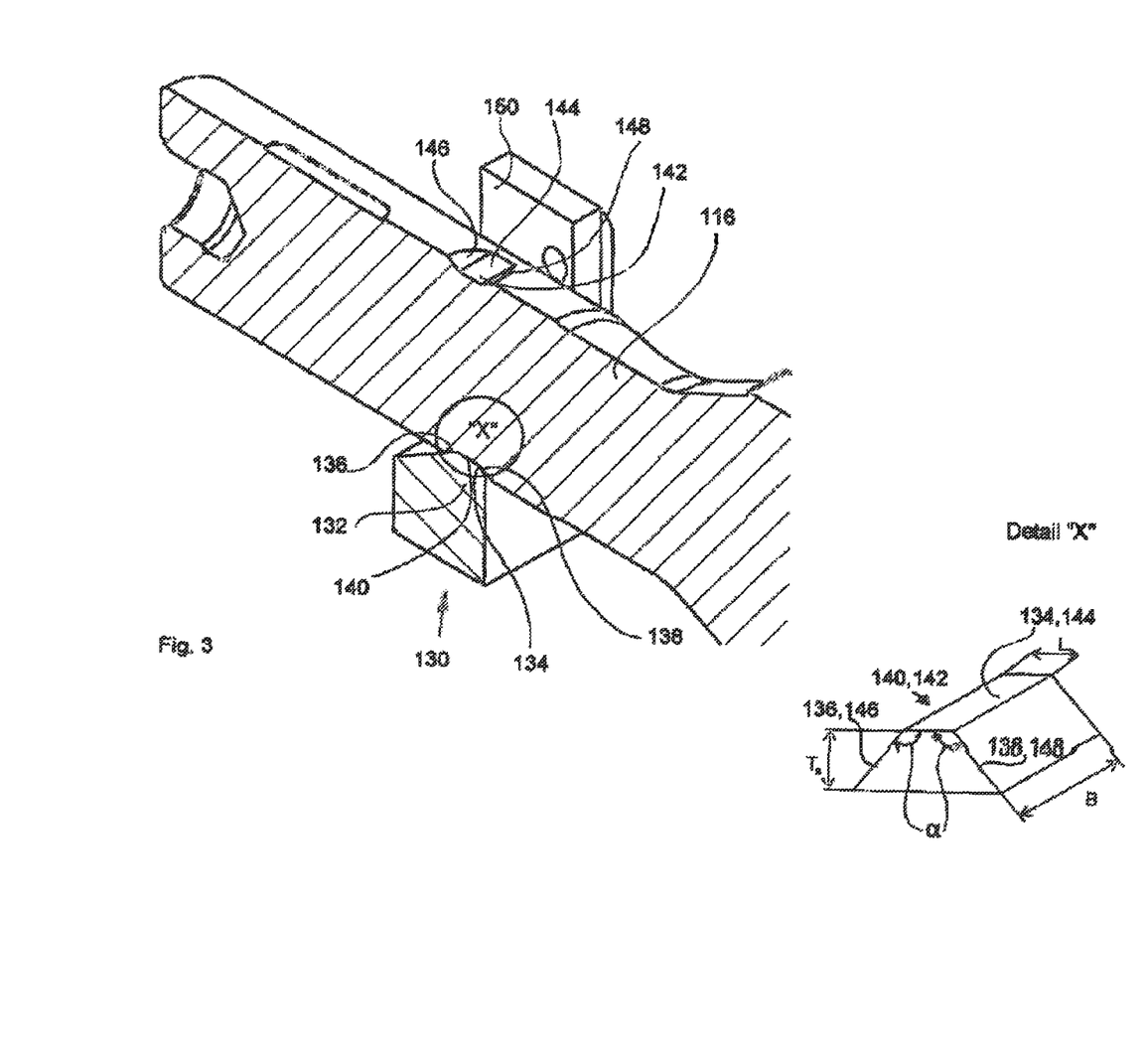
FIG. 3 shows a section and a section of a sonotrode in FIG. 2 in a sectional view.

FIG. 3 shows a section of the sonotrode 116, shown in longitudinal section, in the area of a first bearing 130 running in the oscillation node of the sonotrode 116. The first bearing 130 ensures the axial and radial alignment of the and/or 116 in the ultrasound welding system, that is, the machine body 118 and therefore an orderly alignment with the compression chamber limited by the slider 122 of the guide 124 and with the anvil 126.

As the view of FIG. 3 shows, the first bearing 130 has a projection 132 with a trapezoidal section and serving as support, which projection comprises a base surface 134 running parallel to the longitudinal axis of the sonotrode 116 and comprises side surfaces of flanks 136, 138 running transversely to the longitudinal axis and originating from this base surface. This projection engages into a corresponding recess 140 of the sonotrode 116. The recess 140 also has a section with a trapezoidal geometry as the recess 142 line diametrically opposite the recess 140 illustrates. The corresponding recesses 140, 142 are present in order to be able to rotate the sonotrode 116 about its longitudinal axis in order to associate one of the welding surfaces 120, 168 with the compression chamber to the desired extent, as was also described in EP 1 566 233 A1.

The recess 140 is explained in detail using the recess 142. As can be gathered from the sectional view, the recess 142 has a base surface 144 and side surfaces or flanks 146, 148 emanating from it. The interval of the flanks 146, 148 is slightly greater than the interval of the flanks 136, 138 of the projection 132. If the sonotrode 116 is set on the first bearing 130, then the base surface 140 of the projection 132 lies flat on the base surface 144 of the recess 140. As a result, a radial alignment takes place. Furthermore, the interval of the flanks 146, 148 is slightly greater than that of the flanks 136, 138 so that at least one of the flanks 146, 148 can rest on one of the flanks 136, 138 of the projection 132 since flanks 136, 146 on the left in the drawing and correspondingly also the right flanks 138, 148 run parallel to each other. As a consequence, an axial alignment of the sonotrode 116 takes place.

Figures 5, 6, 7, 8, 9, 10, 11, 12, 13:
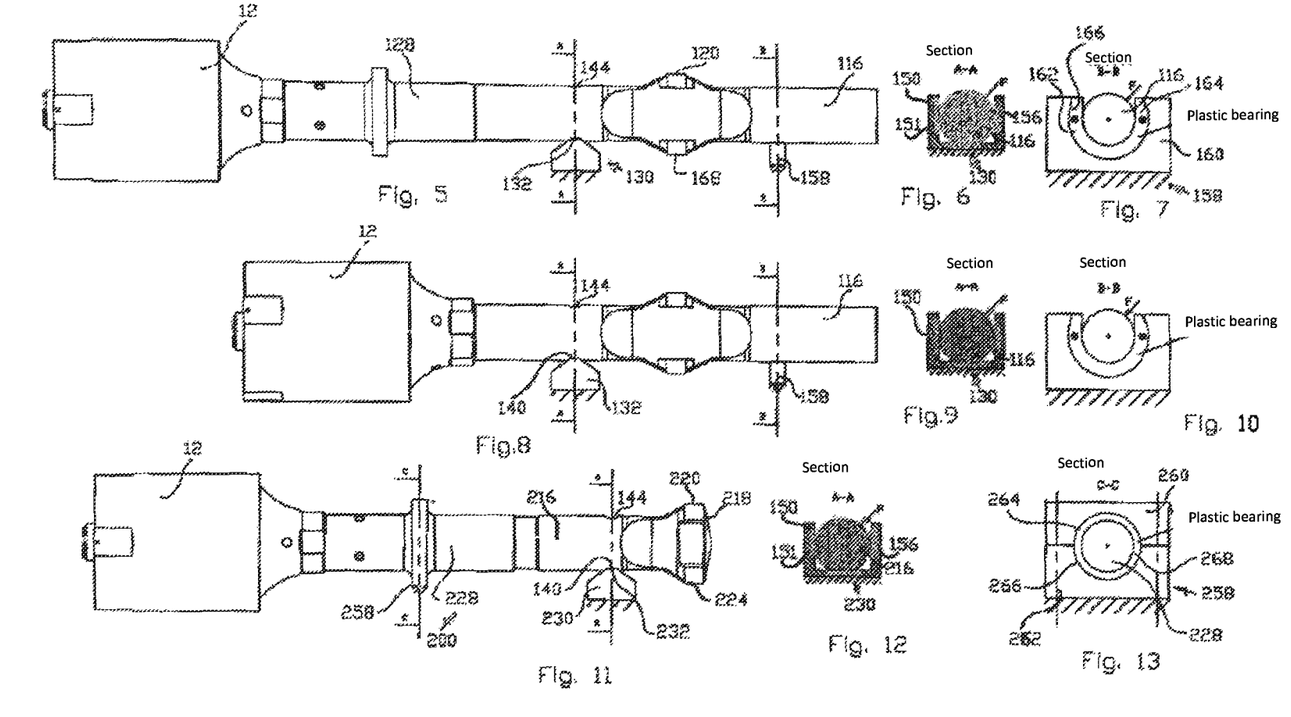
FIG. 5 shows a side view of an oscillator with an λ sonotrode.
FIG. 6 shows a section along the line A-A in FIG. 5.
FIG. 7 shows a section along the line B-B in FIG. 5.
FIG. 8 shows an oscillator with an λ sonotrode in a side view.
FIG. 9 shows a section along the line A-A in FIG. 8.
FIG. 10 shows a section along the line B-B in FIG. 8.
FIG. 11 shows a side view of an oscillator with an λ/2 sonotrode and booster.
FIG. 12 shows a section along line A-A in FIG. 11
FIG. 13 shows a section along line C-C in FIG. 11.

The first bearing 130 with the projection 132 is a cross shank of a U-shaped support 150 in the exemplary embodiment, as also results from the FIGS. 6, 9 and 12. It can also be gathered from the latter that the sonotrode 116 is pressed against one of the shanks and is therefore fixed. In the exemplary embodiment of FIG. 2 the sonotrode 116 is pressed against the side shank 151 of the U-shaped support 150.

The pressure element can be, e.g. a screw and emanate from the base machine body 118. According to FIG. 2 the pressure is a screw element 152 that runs through the left side shank 156 of the U-shaped support 150, which shank runs at a distance to the sonotrode 116.

The interval between the welding surface 120 and the first bearing 130 is λ/4, wherein the first bearing 130 runs in the oscillation node of the sonotrode 116 and the welding surface 120 runs in the maximum amplitude.

As results from the enlarged section of FIG. 3, the recess 140 and with it also the recess 142 preferably have the following dimensioning. The base surface 134, 144 has a length L in the longitudinal direction of the sonotrode preferably between 1 mm and 10 mm. The width of the base surface 134, 144, that runs perpendicularly to the longitudinal axis of the sonotrode, should be between 5 mm and 60 mm. The depths of the recess 140, 142 perpendicular to the longitudinal axis of the sonotrode should be between 1 mm and 5 mm. The inside of the particular side shank or flank 136, 138, 146, 148 should enclose an angle α between 90° to 150° with the base surface 134, 144.

The material of the first bearing 130—as also as concerns the other first bearings 230, 330 described in the following-should consist of steel, cast iron such as gray cast iron, cast iron with spherical graphite, bronze, fiber-reinforced plastic, ceramics, carbon-fiber-reinforced carbon or other suitable materials, wherein the materials are to be selected in such a manner that a damping is achieved to the desired extent. Also, a high wear resistance should be given.

The sonotrode 116 is supported in a second bearing 158 relative to the welding surface 120 opposite the first bearing 130, which second bearing is shown in section in FIG. 7. The second bearing 158 is a plastic bearing. A support 160 has a plastic jacketing 162 that positively receives the sonotrode 116. The jacketing 162 has a U-shaped geometry with side shanks 164, 166 whose inside interval is equal to or slightly greater than the cross-sectional width of the sonotrode 116 so that an insertion or removal of the sonotrode 116 is made possible with simple measures. It can also be recognized by the arrow F that the sonotrode 116 experiences a loading by force into the second bearing 158. This can be brought about by a pivot lever 166 originating from the machine body 118. The second bearing 158 also runs at a distance λ/4 from the welding surface 120. A deviation of up to ±10 mm, in particular up to ±5 mm is possible.

As the view of FIG. 5 shows, another welding surface 168 originates from the central area of the sonotrode 116 opposite the welding surface 120. In order to utilize it the sonotrode 116 must be rotated through 180° so that as a consequence the upper recess 144 shown in the figure engages in the previously described manner into the trapezoidal projection 132 of the first bearing 130.

A λ oscillator is also shown in the FIG. 8-10 that comprises the sonotrode 116 with the previously described construction and bearing. However, the sonotrode 116 originates directly from the converter 12. The first and the second bearing 130, 158 and the association with the sonotrode 116 are designed in accordance with the previously presented description.

The FIGS. 4 and 11-13 show an oscillator 200 that comprises a sonotrode 216 with a length λ/2 and a booster 228. The sonotrode 216 comprises a sonotrode head 218 in a known manner with two welding surfaces 220, 224 in the exemplary embodiment distributed evenly around the circumference. A bearing 230 that corresponds to the bearing 130 is provided at a distance λ/4 from the welding surfaces 220, 224 and the front surface of the sonotrode head 218, therefore, directly adjacent to the welding surfaces 220, 224, so that reference is made to the explanations given in this regard. The sonotrode 216 comprises recesses 140, 144 corresponding to the geometry of the projection 232.

Furthermore, the booster 228 is supported in a bearing designated in the following as third bearing 258, which is shown in section in FIG. 13. The third bearing 258 comprises two partial bearing elements 260, 262 comprising a semicircular recess 264, 266 that are jacketed with a ring 268 consisting of plastic that surrounds the booster 228. Consequently, the third bearing 258 is a plastic bearing in the form of a movable bearing.

Figure 4:
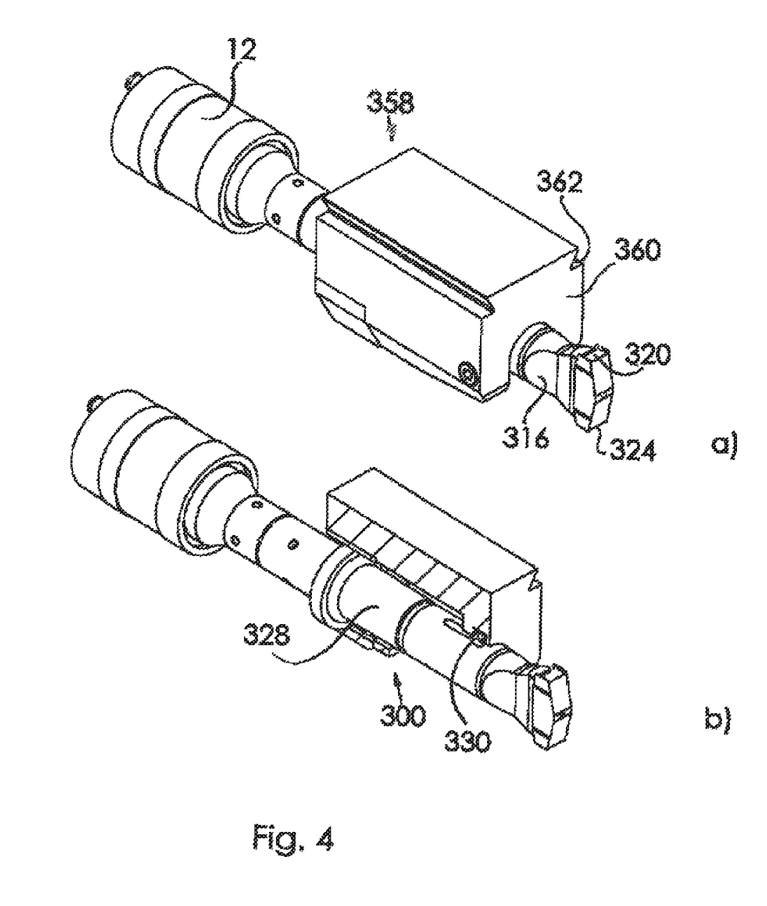
FIG. 4 shows an oscillator of a punctual welding system.

If, according to the exemplary embodiment of FIG. 11, the active welding surface is the upper one in the drawing and provided with the reference numeral 200, then an oscillator 300 of a punctual welding system is shown in FIG. 4 in which the active welding surface runs along the bottom side. In distinction to the view of FIGS. 11-13, the oscillator 300, i.e., its sonotrode 316 is supported in the sketched view on the top, i.e., the first bearing 330 does not run on the bottom in distinction to the exemplary embodiment of FIGS. 11-13. The support serving as the first bearing 330 has a rod-shaped form and runs perpendicularly to the longitudinal direction of the longitudinal axis of the sonotrode. On the sonotrode side the support has the required trapezoidal geometry in order to engage into a geometrically adapted recess of the sonotrode 316, as was explained using the other exemplary embodiments.

The oscillator 300 is supported in accordance with the exemplary embodiment of the FIG. 11-13 on the one hand by the first bearing 330 and on the other hand by a second bearing 358 in the area of the booster 328. The second bearing 358 corresponds to the bearing 258 according to FIG. 13. The first and the second bearings 330, 358 are arranged in a surrounding housing 360 into which the oscillator 300 can be inserted in order to be fixed in the bearings 330, 358.

The surrounding housing 360 has a limitation 362 forming a dovetail and which can be inserted into a geometrically adapted dovetail receptacle of a housing of the punctual welding system. Therefore, the oscillator 300 can be introduced into the punctual welding system with simple constructive measures, wherein a re-adjustment of the oscillator 300 is not necessary since it is radially and axially aligned on account of the teaching of the invention.

According to the FIG. 11 the sonotrode 316 shown in FIG. 4 is supported at a distance λ/4 from the welding surfaces 320, 324 and has a length λ/2, wherein λ is the wavelength of the sonotrode 316. The booster 328 also has a length λ/2 and is supported at a distance λ/2 from the first bearing 330 in the second bearing 358.

The invention claimed is:

1. An ultrasonic welding device with an oscillator, comprising a sonotrode that can be put in oscillation with a wavelength λ and comprises at least one welding range in the maximum amplitude of the sonotrode, wherein the sonotrode is supported in its oscillating node in a first bearing, characterized in that the first bearing, comprises a projection that has a U-shaped geometry with side shanks in a section running in the longitudinal direction of the sonotrode and has a cross shank connecting them, that the projection engages into a recess in the sonotrode adapted to the U-shaped geometry, that the sonotrode is supported flat on the cross shank of the projection, and that an axial alignment of the sonotrode takes place via at least one side shank of the projection.

2. The ultrasonic welding device according to claim 1, characterized in that the projection has a trapezoidal geometry and in particular is a symmetrical trapezoid in section.

3. The ultrasonic welding device according to claim 1, characterized in that in the case of the sonotrode fixed in the ultrasonic welding device this sonotrode rests flat on one of the side shanks of the projection.

4. The ultrasonic welding device according to claim 1, characterized in that the first bearing comprises a support running transversely to the longitudinal axis of the cross shank of the projection and in the longitudinal direction of the sonotrode against which support the sonotrode can be pressed by a force (F) acting on it.

5. The ultrasonic welding device according to claim 1, characterized in that the sonotrode is a sonotrode with a length λ, that in its central area at least one welding area runs, and that the first bearing runs on one side of the welding area and a second bearing runs on the other side of the welding area at a distance of λ/4.

6. The ultrasonic welding device according to claim 1, characterized in that the second bearing is a plastic bearing.

7. The ultrasonic welding device according to claim 1, characterized in that the sonotrode is positively supported in the second bearing that has on the sonotrode side a U-shape with side shanks whose inside interval on the opening side is equal to or slightly larger than the cross-sectional width of the sonotrode between the side shanks.

8. The ultrasonic welding device according to claim 1, characterized in that the sonotrode is connected to a booster that is supported in a third bearing in the longitudinal direction of the sonotrode at an interval of $3/4\lambda$ from the at least one welding area.

9. The ultrasonic welding device according to claim 1, characterized in that the third bearing is in particular a plastic bearing preferably in the form of a movable bearing.

10. The ultrasonic welding device according to claim 1, characterized in that the third bearing comprises two partial bearing elements that each comprise on the booster side a semicircular receptacle that are jacketed with plastic.

* * * * *